No. 836,039. PATENTED NOV. 13, 1906.
P. O. HOLMGREN.
ANIMAL POKE.
APPLICATION FILED JAN. 4, 1906.
2 SHEETS—SHEET 1.
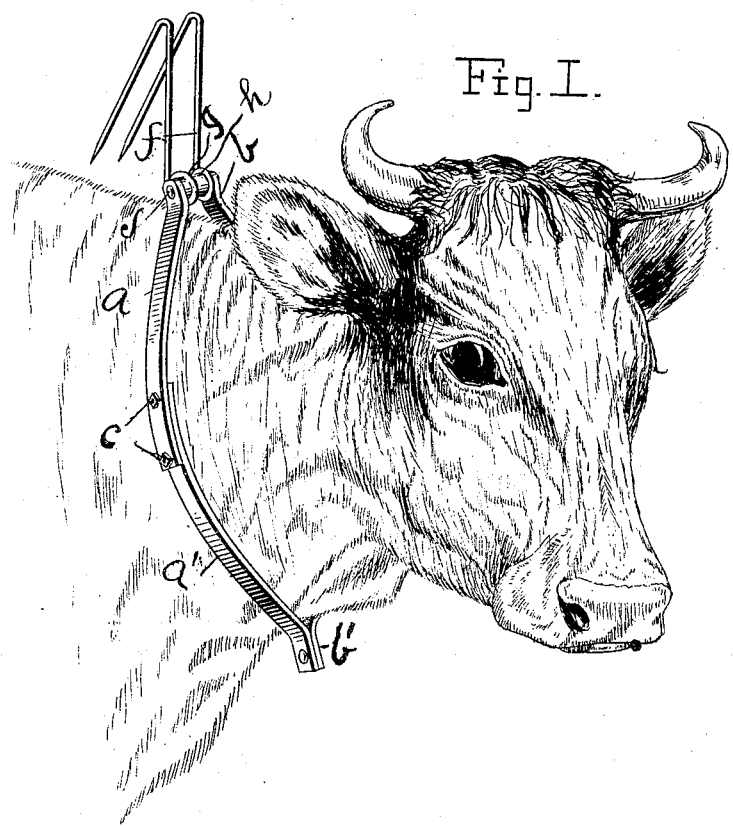
Fig. I.
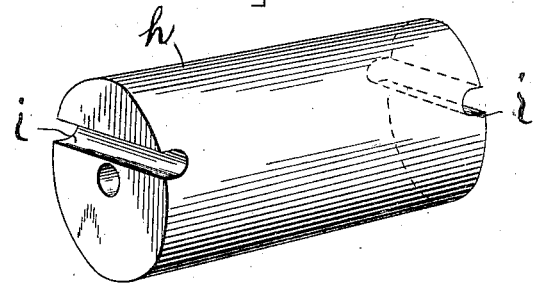
Fig. 2.
Witnesses
E. K. Reichenbach.
F. C. Jones
Inventor
P. O. Holmgren,
By
Attorneys.

No. 836,039. PATENTED NOV. 13, 1906.
P. O. HOLMGREN.
ANIMAL POKE.
APPLICATION FILED JAN. 4, 1906.
2 SHEETS—SHEET 2.
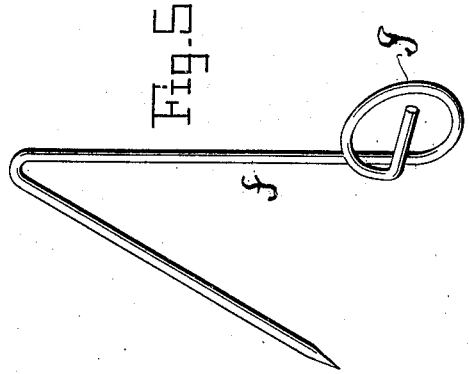
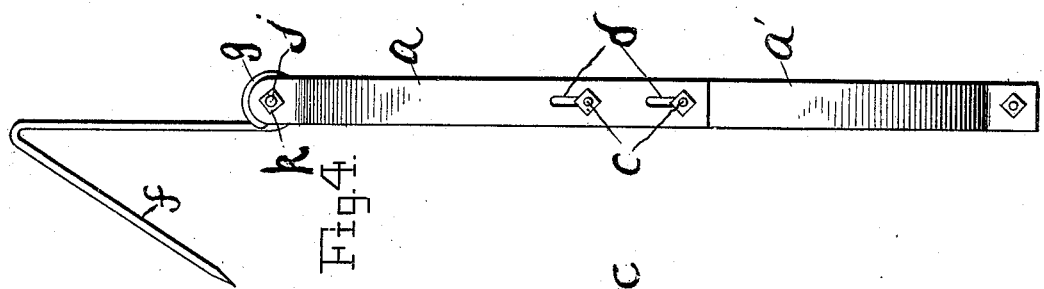
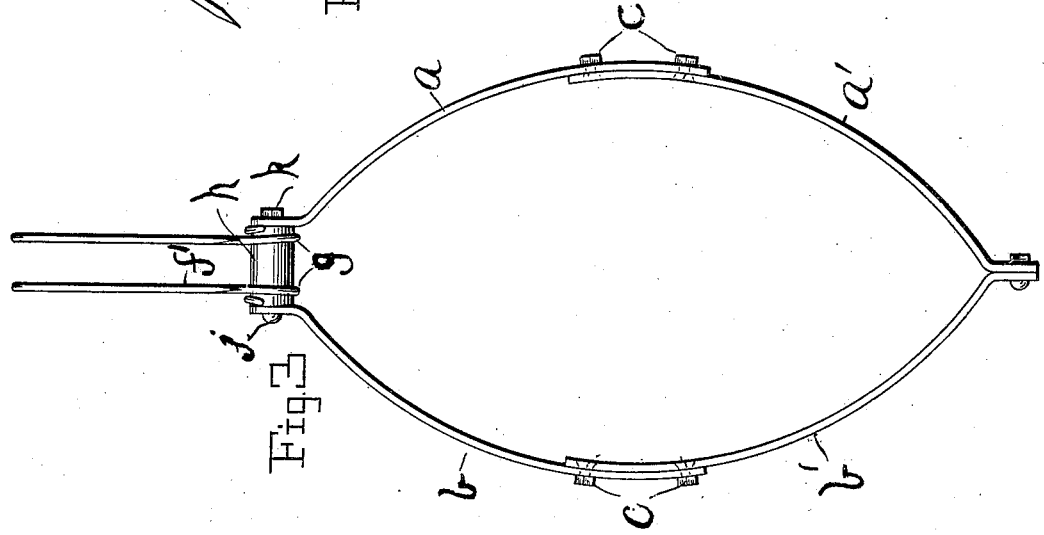

UNITED STATES PATENT OFFICE.

PETER O. HOLMGREN, OF HOFFMAN, MINNESOTA.

ANIMAL-POKE.

No. 836,039.  Specification of Letters Patent.  Patented Nov. 13, 1906.

Application filed January 4, 1906. Serial No. 294,619.

*To all whom it may concern:*

Be it known that I, PETER O. HOLMGREN, a Swedish subject, residing at Hoffman, in the county of Grant, State of Minnesota, have invented certain new and useful Improvements in Animal-Pokes; and I do hereby declare the following to be a full, clear, and exact description of the invention, such as will enable others skilled in the art to which it appertains to make and use the same.

This invention has relation to animal yokes or pokes for cattle and live stock generally.

It is the object of the invention to provide a poke for live stock, particularly cattle, that have become or are liable to become breechy and break through wire and other fencing.

The invention is designed to prevent the animals wearing the poke from committing the mischief named.

It is well known by cattle-raisers and others that the animals soon become accustomed to barb-wire fencing, so that they will without such hurt to themselves as to stop them work their way between the wires once they get their heads through between the wire and either break them down or push them aside, so as to get through, making the fencing of the kind mentioned useless. As for smooth or twisted wire it will not withstand the onslaughts of breechy cattle at all My invention consists of a poke or yoke made to go round the neck of cattle and to engage the wires, so as to cause the pricks or points with which the yoke is provided to prod or "stick" them to a degree or extent that will cause them to desist in trying to break down the fence.

The drawings hereto annexed form a part of this specification and are to be referred to as such.

Of the said drawings, Figure 1 is a perspective view of the poke in use. Fig. 2 is a detail perspective view of an element of the structure. Fig. 3 is a front elevation. Fig. 4 is a side elevation. Fig. 5 is a detail view.

The same letters of reference designate the same parts wherever they occur.

In the production of my invention I provide two ribs or bows, one for each side of the neck, which ribs or bows are made from lengths of flat steel or iron bars divided on each side, constituting pieces $a$ $a'$ on one side and $b$ $b'$ on the other. These parts are bent to proper form, and one part on each side overlaps the other, and the two parts are connected by means of a bolt $c$, engaged therethrough and having the usual nut, as illustrated. In this way the ends of the two parts of the ribs may be slipped upon each other to adjust the collar and make it to fit any animal to which it is likely to be applied.

$f$ designates the prods, which are made of wire, adapted at their coiled ends $g$ to be connected with the spool or barrel $h$, and which extend upward about eight inches from the top of the yoke or collar, where they are given an angular bend down again to a point in close proximity to the neck of the animal. The wires $f$ have their free ends sharpened and formed into prods. The spring-arm of each prod $f$ may rest in a groove $i$, formed across the end of the barrel $h$, and a bolt $j$ (see Figs. 1, 3, and 4) is passed through the upper end of the ribs and through a hole in the spool and has a nut $k$ turned on the end, whereby the upper ends of the ribs, the spool, and associated parts are held together.

The upward projections of the prods are to serve as hold-backs if the animal wearing them should try to go through between the wires, as is their wont, and should they try it the projection will strike against the wire of the fence, push them back, so as to bring the sharp prods on the free ends down upon the animal's neck, causing the said animal to desist, for the harder they press the more effective will the prods be, so that it will be impossible for the animals to break the fence-wires. They will not only cease trying on one occasion, but they will eventually be broken of the breechy habit entirely.

What I claim is—

A cattle-poke consisting of two bows fitting the sides of the neck and secured together in a suitable manner at the bottom, a small barrel between the upper ends of the bows, angular prod-springs secured at one end to the barrel, and a bolt and nut passing through the upper ends of the bows and the barrel for holding the parts together as explained, and the free ends of the angular prod-springs being sharpened and extending in close proximity to the animal's neck.

In testimony whereof I affix my signature in presence of two witnesses.

PETER O. HOLMGREN.

Witnesses:
 WILLIAM SCHELLBACH,
 CARL A. FUGLIE.